United States Patent [19]

Reynard et al.

[11] Patent Number: 4,720,779
[45] Date of Patent: Jan. 19, 1988

[54] STORED LOGIC PROGRAM SCANNER FOR A DATA PROCESSOR HAVING INTERNAL PLURAL DATA AND INSTRUCTION STREAMS

[75] Inventors: Fred T. Reynard, King of Prussia, Pa.; Richard J. Manco, Riverside, N.J.

[73] Assignee: Burroughs Corporation, Detroit, Mich.

[21] Appl. No.: 625,612

[22] Filed: Jun. 28, 1984

[51] Int. Cl.⁴ .............................................. G06F 15/16
[52] U.S. Cl. .................................................... 364/200
[58] Field of Search ... 364/200 MS File, 900 MS File, 364/300

[56] References Cited

U.S. PATENT DOCUMENTS

| | | | |
|---|---|---|---|
| 3,760,369 | 9/1973 | Kemp | 340/175.2 |
| 3,833,889 | 9/1974 | Cray | 340/175.2 |
| 4,415,971 | 11/1983 | Guillemet et al. | 364/200 |
| 4,456,958 | 6/1984 | DeSantis et al. | 364/200 |
| 4,463,423 | 7/1984 | Potash et al. | 364/300 |
| 4,636,948 | 1/1987 | Gdaniec et al. | 364/300 |

Primary Examiner—Archie E. Williams, Jr.
Assistant Examiner—Michael J. Ure
Attorney, Agent, or Firm—Mervyn L. Young; L. Joseph Marhoefer; Kevin R. Peterson

[57] ABSTRACT

A program scanner for a processor having multiple internal streams of instruction and data flow scans a sequence of incoming codes, and employs a plurality of rams to detect various types of syllables in that code. The contents of these rams are signals indicating the various types of codes possible with the output of the rams then being multiplexed to provide an output indicating which syllables can be grouped together for transmission to various units of the processor.

6 Claims, 7 Drawing Figures

Fig.5A

| SYLLABLE * | | | | | | OP SEL | SHIFT | POS OP | SELECT A.C. | SELECT LT | COND. PARAM. |
|---|---|---|---|---|---|---|---|---|---|---|---|
| 0 | 1 | 2 | 3 | 4 | 5 | | | | | | |
| L1 | T̄O | | | | | 0 | — | LT | 1,2 | 0,1 | +1 |
| L1 | TO | A.C. | | | | 1 | 2 | LT | 1,2 | 0,1 | +1 |
| L1 | VC | A.C. | TO | | | 3 | 4 | LT,VC | 1,2 | 0,1 | +2 |
| L1 | NC | A.C. | TO | | | 3 | 4 | LT,NC | 1,2 | 0,1 | +2 |
| L1 | LNCO | A.C. | | | | 1 | 4 | LT,NC | 2,3 | 0,1 | +2 |
| L1 | VC/NC | A.C. | T̄O | | | 0 | — | LT | 1,2 | 0,1 | +1 |
| 0 | 1 | 2 | 3 | 4 | 5 | | | | | | |
| L2 | DATA | T̄O | | | | 0 | 2 | LT | 2,3 | 0,1 | +1 |
| L2 | DATA | TO | A.C. | | | 2 | 3 | LT | 2,3 | 0,1 | +1 |
| L2 | DATA | VC | A.C. | TO | | 4 | 5 | LT,VC | 2,3 | 0,1 | +2 |
| L2 | DATA | NC | A.C. | TO | | 4 | 5 | LT,NC | 2,3 | 0,1 | +2 |
| L2 | DATA | LNCO | A.C. | | | 2 | 5 | LT,NC | 3,4 | 0,1 | +2 |
| L2 | DATA | VC/NC | A.C. | T̄O | | 0 | 2 | LT | 2,3 | 0,1 | +1 |
| 0 | 1 | 2 | 3 | 4 | 5 | | | | | | |
| VC | A.C. | T̄O | | | | 0 | 2 | VC | 0,1 | 0,1 | +1 |
| VC | A.C. | TO | | | | 2 | 3 | VC | 0,1 | 0,1 | +1 |
| VC | A.C. | L1 | TO | | | 3 | 4 | VC,LT | 0,1 | 1,2 | +2 |
| VC | A.C. | L3 | DATA | TO | | 4 | 5 | VC,LT | 0,1 | 2,3 | +2 |

Fig.5B

| 0 | 1 | 2 | 3 | 4 | 5 | | | | | | |
|---|---|---|---|---|---|---|---|---|---|---|---|
| VC | A.C. | L3 | DATA | DATA | TO | 5 | 6 | VC,LT | 0,1 | 3,4 | +2 |
| VC | A.C. | Ln | DATA | DATA | TO | 0 | 2 | VC | 0,1 | n,n+1 | +1 |

| 0 | 1 | 2 | 3 | 4 | 5 | | | | | | |
|---|---|---|---|---|---|---|---|---|---|---|---|
| L3 | DATA | DATA | TO | | | 0 | 3 | LT | 3,4 | 1,2 | +1 |
| L3 | DATA | DATA | TO | A.C. | | 3 | 4 | LT | 3,4 | 1,2 | +1 |
| L3 | DATA | DATA | VC | A.C. | TO | 5 | 6 | LT,VC | 3,4 | 1,2 | +2 |
| L3 | DATA | DATA | NC | A.C. | TO | 5 | 6 | LT,NC | 3,4 | 1,2 | +2 |
| L3 | DATA | DATA | VC/NC | A.C. | TO | 0 | 3 | LT | 3,4 | 1,2 | +1 |

| 0 | 1 | 2 | 3 | 4 | | | | | | |
|---|---|---|---|---|---|---|---|---|---|---|
| NC | A.C. | TO | | | 0 | 2 | NC | 0,1 | x | +1 |
| NC | A.C. | TO | | | 2 | 3 | NC | 0,1 | x | +1 |

| 0 | 1 | 2 | 3 | 4 | | | | | | |
|---|---|---|---|---|---|---|---|---|---|---|
| DU | TO | | | | 0 | 1 | DU | x | x | DU |
| DU | LOAD | | | | 1 | 2 | DU | x | x | DU |
| DU | LODT | | | | 1 | 2 | DU | x | x | DU |

| 0 | 1 | 2 | 3 | 4 | | | | | | |
|---|---|---|---|---|---|---|---|---|---|---|
| VARI | OP | | | | 1 | 2 | | 2,3 | 0,1 | +0/+1 |
| VARI | OP | P1 | | | 1 | 3 | | 2,3 | 0,1 | +0/+1 |
| VARI | OP | P1 | P2 | | 1 | 4 | SWAP A.C. | 2,3 | 0,1 | +0/+1 |
| VARI | RSDN | | | | 1 | 2 | | x | x | +0 |

|   | 0 | 1 | 2 | 3 | 4 | 5 |
|---|---|---|---|---|---|---|
|   | T0 |   |   |   |   |   |
|   | T0 | P1 |   | 0 | 0/1 | 0,1/1,2 | n,n+1 | +0/+1 |
|   | T0 | P1 | P2 | 0 | 2 | 0,1/1,2 | n,n+1 | +0/+1 |
|   |    |    |    | 0 | 3 | 0,1/1,2 | n,n+1 | +0/+1 | n :=> A NUMBER FROM 0 TO 3
T0 :=> TERMINAL OP
OP :=> OPERATOR
Pn :=> A CODE PARAMETER

*Fig.5C*

| FIG.5A |
|--------|
| FIG.5B |
| FIG.5C |

*Fig.5*

STORED LOGIC PROGRAM SCANNER FOR A DATA PROCESSOR HAVING INTERNAL PLURAL DATA AND INSTRUCTION STREAMS

BACKGROUND OF THE INVENTION

1. Field of the Invention

This invention relates to a stored logic program scanner for a general purpose data processor and more particularly to such a processor having plural data and instruction streams.

2. Description of the Prior Art

Prior art data processors have in general been sequential in nature due to the sequential nature of conventional imperative code they employ. A particular processor module of this type is disclosed in the Barton, et al. U.S. Pat. Nos. 3,461,434, 3,546,677 and 3,548,384. These patents are directed toward a stack oriented data processor where the function of the stack mechanism, a first-in last-out mechanism is to handle the flow of operators and associated parameters in a manner which reflects on the nested structure of particular higher level languages. However, where it is desired to provide the customer with an upgrade to such a processor, it becomes necessary to increase the throughput of the processor while maintaining program compatibility with previous and smaller members of the same processing family.

The execution of a sequence of code involves three basic forms of processing: the processing of the instruction format, the processing of the references created by that instruction and the execution of the function specified by the instruction. In a simple sequential machine the total time to execute a sequence $S_o, S_i \ldots S_n$ is $(I_o + R_o + E_o) + (I_i + R_i + E_i + \ldots (I_n + R_n + E_n)$ where I is an instruction processing, R is a reference processing and E is an execution processing. In a simple pipeline machine, ignoring certain dependencies, the same sequence can be executed in a time equal to the largest sum of a processing stage, namely $(I_o + I_i + \ldots I_n)$ and so forth where the individual instruction processing, reference processing and execution processing are done in parallel.

However, sequential object code as received from a higher level language compiler does not always contain the proper sequencing of code for easy segregation to be sent to various units of such a parallel processor for execution. Thus, a program scanner is provided to scan the incoming code and determine what segments of the code can be grouped together for transmission to various units of the processor.

It is then an object of the present invention to provide an improved program scanner for a multiple instruction and data stream processor.

It is another object of the present invention to provide an improved program scanner which scans the incoming code and groups appropriate syllables be they instructions, references (to data) or literal values for transmission on to various units of the processor.

It is still a further object of the present invention to provide such a program scanner employing stored logic as required to provide easy expansion of the scanner's functions to recognize new groups that might be added to the object code set of instructions.

SUMMARY OF THE INVENTION

In order to achieve the above-identified objects, the present invention is directed toward an improved program scanner for a processor having multiple internal streams of instruction and data flow. The scanner scans a sequence of incoming codes, and employs a plurality of rams to detect various types of syllables in that code. The contents of these rams are signals indicating the various types of codes possible with the output of the rams then being multiplexed to provide an output indicating which syllables can be grouped together for transmission to various units of the processor.

A feature then of the present invention resides in an improved program scanner to scan a sequence of codes to determine which syllables can be properly grouped together for transmission to various units of the processor.

BRIEF DESCRIPTION OF THE DRAWINGS

The above and other objects, advantages and features of the present invention will become more readily apparent from a review of the following specification when taken in conjunction with the drawings wherein:

FIGS. 5A, B, and C are tables illustrating the various outputs of grouped syllables that are emitted by the program scanner of the present invention.

DESCRIPTION OF THE PREFERRED EMBODIMENT

Figure 1:
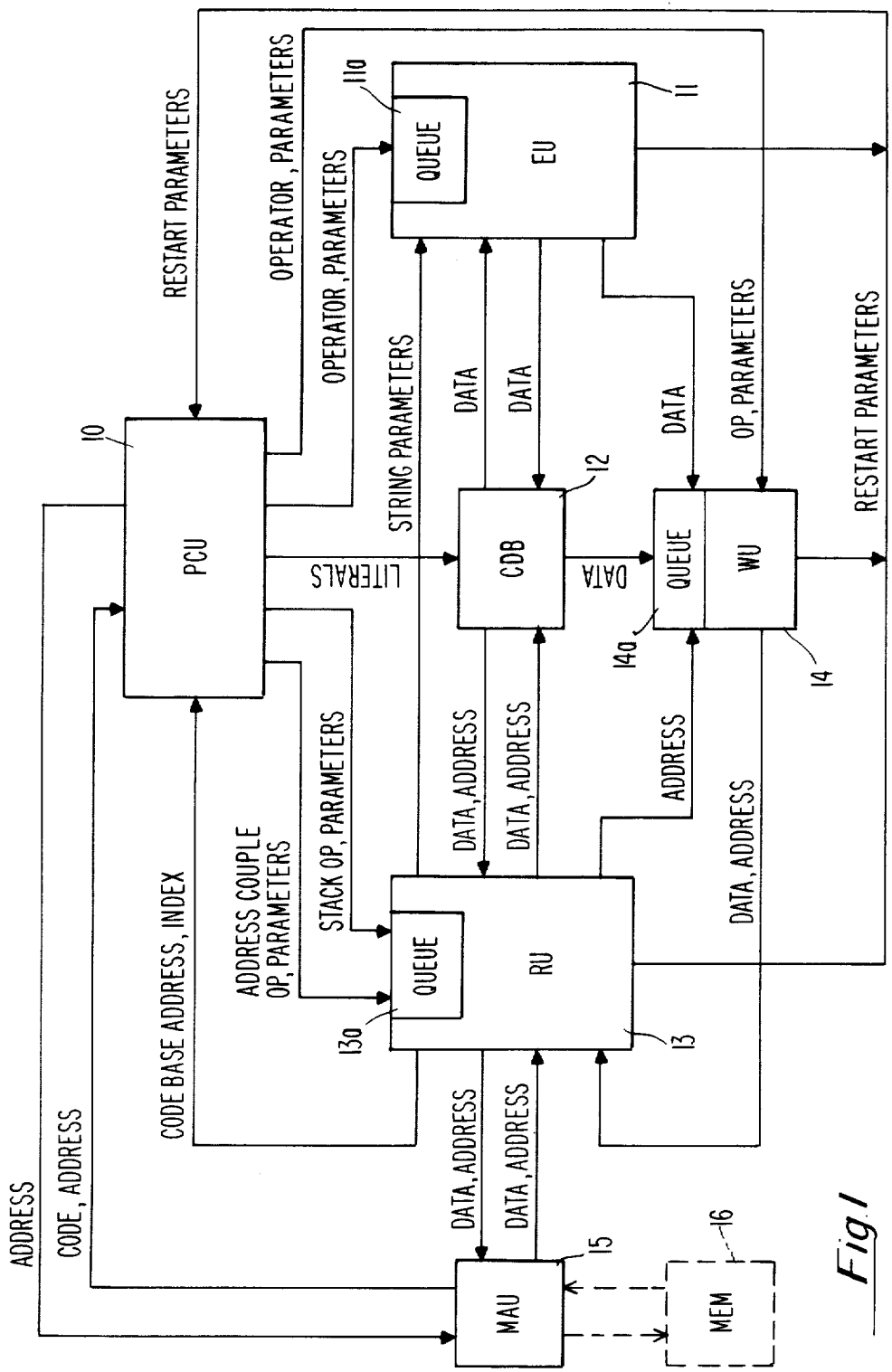
FIG. 1 is a schematic diagram of a processor employing the present invention.

A general purpose processor employing the present invention is illustrated in FIG. 1. This processor includes a program scanner or program control unit 10 which is the subject of the present application and which receives strings of code from memory 16 by way of memory addressing unit 15 and supplies operators and parameters to execution unit 11, reference unit 13 and write unit 14 and also data or literal values to central data buffer 12 which in turn can be accessed by both execution unit 11 and reference unit 13.

As illustrated in FIG. 1, execution unit 11 receives operators and parameters by way of execution unit queue 11a for subsequent execution in the order in which they are received. Similarly, reference unit 13 is also provided with a reference unit queue 13a to receive address couples, operators and parameters. It is the function of the program scanner 10 of the present invention to supply these operators and parameters to the other units in parallel and to keep the units' respective queues filled so that those units can be operating concurrently.

Figure 2:
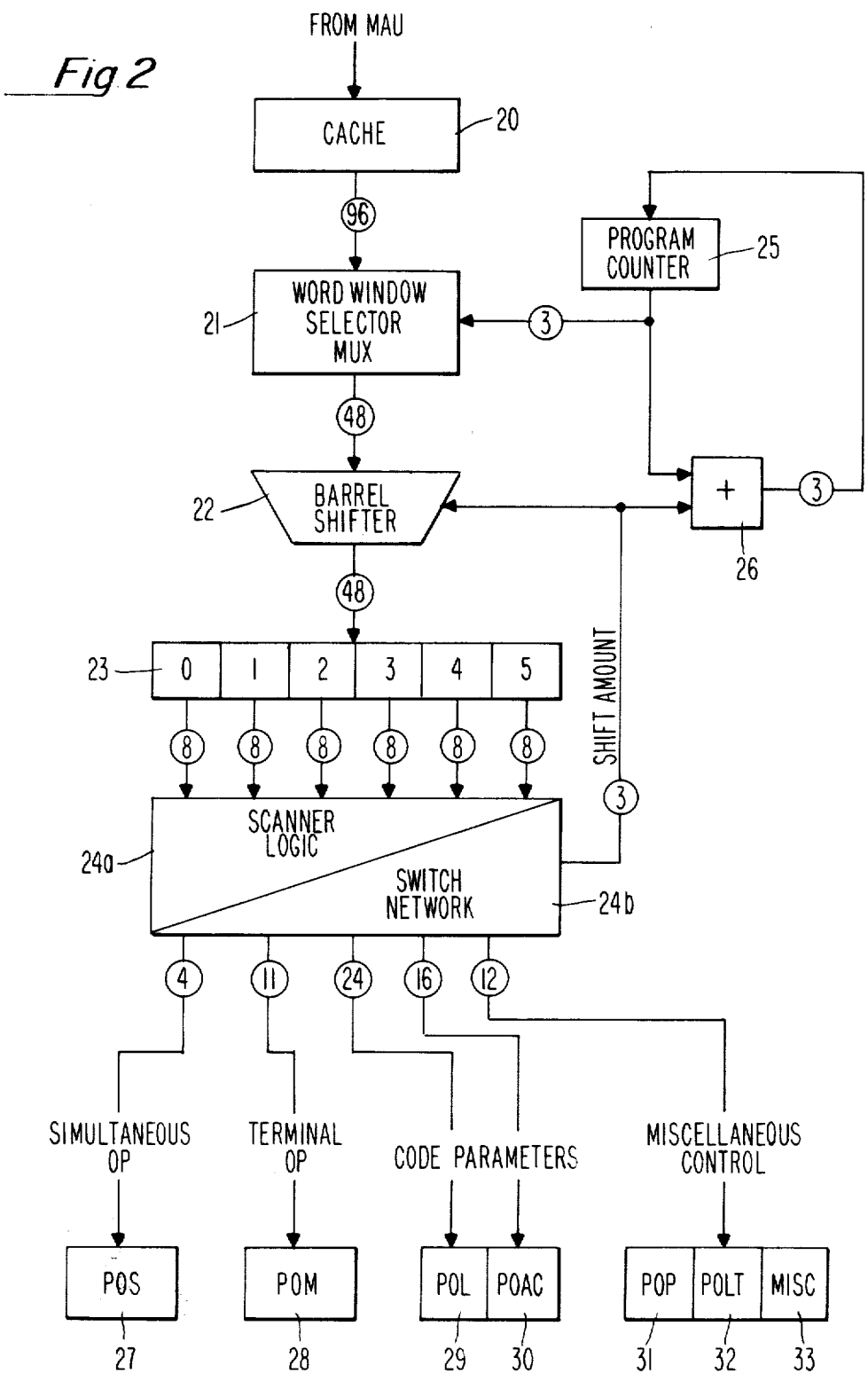
FIG. 2 is a schematic diagram of the program scanner of the present invention.

FIG. 2 is a diagram illustrating the general organization of the program scanner of the present invention. As shown therein, code is received from memory 16 of FIG. 1 by way of memory address unit 15 and stored in cache memory 20 of FIG. 2. In the present invention, words are formed from the code, Which words are 48 bits in width or six 8-bit syllables in width. Word window selector 21 receives two such words from cache 20 under control of program counter 25 as will be more fully described below. Six of these syllables are then selected by word window selector 21 for transmission to barrel shifter 22 which shifts those syllables left according to the shift amount value received from the scanner multiplexor structure 24a and b.

The six 8-bit syllables from barrel shifter 22 are then transmitted to scan register 23 where they are scanned in parallel by scanner logic 24a to determine if there is an appropriate grouping of syllables for further transmission to other units of the processor.

Depending upon the acceptable groups of syllables determined by scanner logic 24a, the appropriate syllables are then transmitted simultaneously by switch network 24b to the scanner output registers 27, . . . , 33. Depending upon the number of syllables that were transmitted from the scanner register 23 to the output registers, the shift amount is determined and sent to barrel shifter 22, as explained above to specify number of syllables necessary to refill scan register 23. The shift amount value is added to the contents of program counter 25 to notify word window selector which additional syllables are to be sent to scan register 23.

The contents of the output registers 27, . . . , 33 supply their contents to other units of the processor. In certain cases, instruction operators may address a control store (not shown) and in turn supply micro-operators to the appropriate unit. However, that is outside the scope of the present invention.

These output registers are POS register 27 which can contain a literal, value call or memory address operator. POM register 28 contains a microcode as a terminal operator as will be more fully described below. Registers POL 29 and POAC 30, respectively, contain a code literal and an address couple. POP register 31 contains a stack parameter which along with POS register 27 controls the top of stack which resides in central data buffer 12 of FIG. 1. POLT register 32 contains a type code which differentiates the formats of the literal values contained in POL register 29.

In regard to the relation between the various output registers of FIG. 2 and the other units of FIG. 1, the operator registers 27-29 and 31-32 are coupled to execution unit 11 of FIG. 1. Registers 27-28 and 30-32 are coupled to reference unit 13, and the registers 29 and 32 are coupled to central data buffer 12 of FIG. 1.

The scanner of FIG. 2 has potential of recognizing groups of up to three operators through the use of the scanner logic 24a of FIG. 2. It may extend from the current head of the code stream down through the next two adjacent operators. The code stream head is referred to as the root operator and is located in syllable 0 of scan register 23. As the code stream is scanned for operators or operator groups, the scan register is updated by the number of syllables as the operator or operator groups extracted therefrom, as was indicated above. The scanner is designed to group only the most highly used and therefore most performance-oriented operator groups.

The algorithm employed by scanner logic 24a is dependent on the code stream head or root, i.e., the next syllable or instruction in the code stream which is the occupant of syllable 0 of scan register 23 in FIG. 2. Consider that OP1 is the root instruction and OP2 and OP3 are the next two subsequent instructions. The scanning algorithm or decision tree is as described below, where the term "terminal" or "terminates" is used to describe when the instruction scanning stops and the term "extends" is employed to indicate the transfer of control to the next instruction respectively. The result of this scanning algorithm drives the various elements of the scanner of FIG. 2 such as the scan register shift, instruction selection and so forth.

If OP1 extends control to OP2
THEN if OP2 extends control to OP3
  THEN if OP3 terminates OP1:OP2
    THEN extract OP1:OP2:OP3
    ELSE extract OP1
  ELSE if OP2 terminates OP1
    THEN extract OP1:OP2
    ELSE extract OP1
ELSE extract OP1

The entire implementation must account for the fact that the machine codes for OP1 and OP2 may vary in size from 1 to 3 bytes. This complication is resolved by implementing other paths in the decision tree for all possible length combinations. The first level decision then selects the proper path for its size. The various decision levels will be more thoroughly described below.

DETAILED DESCRIPTION OF THE INVENTION

Figure 3:
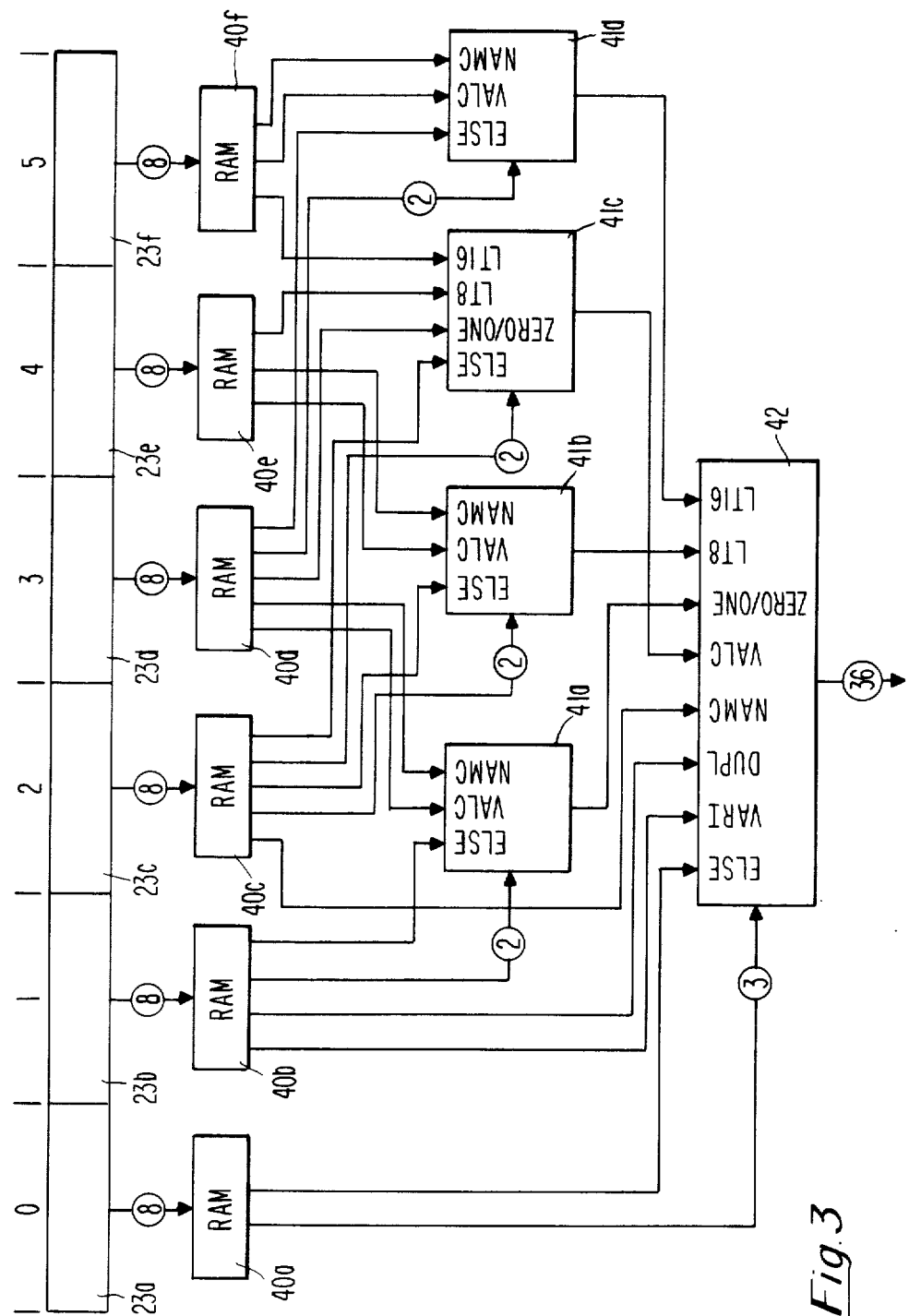
FIG. 3 is a schematic diagram of the scanner structure.

FIG. 3 is a schematic diagram of the scanner logic 24a of FIG. 2. As shown therein, scan register 23 is a shift register and has six syllable positions 23a, . . . , 23f, each of which is an eight-bit register. The contents of these positions are used to address stored logic units or rams 40a, . . . , 40f, the contents of which implement the scanning algorithm or decision tree that was discussed above. As was indicated before, syllable 0 is the root code that initiates the scanning algorithm and, thus, the contents from ram 40a indicate and thus select the various types of eight basic roots that are being implemented by the scanning algorithm and also selects routing of the contents of the respective rams by way of multiplexors 41a, . . . , d to output multiplexor 42.

As shown in FIG. 3, the output control signals from multiplexor 42 are selected by a 3-bit set of control signals from ram 40a that in turn is accessed by syllable 0 in scan register position 23a. In a similar fashion, the outputs to multiplexor 42 from multiplexor 41a are selected by a 2-bit set of control signals from ram 40b, the output of multiplexor 41b is selected by a 2-bit set of control signals from ram 40c, the output of multiplexor 41c is selected by a 2-bit set of control signals which are also from ram 40c, and the output of multiplexor 41d is selected by a 2-bit set of control signals from ram 40d.

Before describing the operation of the scanner logic of FIG. 3, a more detailed explanation will be given of the various root operators and their effect on the selection of various syllables from register 23 of FIG. 2 to the respective output registers of the program scanner of FIG. 2 by way of switching network 24b of that figure.

The operator set employed in the present invention can be broken down into eight basic groups: the variant operator (VARI) or supplement to the standard primary operators, the duplicate operator (DUPL) which duplicates the top of stack item in central data buffer 12 of FIG. 1, name call operator (NAMC) which places an indirect memory address on the stack, the value call operator (VALC) which fetches an operand from memory and places it on the top of stack, a 16-bit literal value (LT16), and 8-bit literal value (LT8), ZERO/ONE, and ELSE (none of the above).

The VARI root allows no operators to be grouped or adjoined to it. This root merely transfers control of the scanner logic from the SCAN 0 control store table in ram 40a of FIG. 3 to the SCAN V (VARI) table in ram 40b. Also, the ELSE root allows no operators to be adjoined to it. All but the VARI and the remaining six roots belong to the ELSE class of operators. No significant cost-effective advantage has been determined in allowing grouping of ELSE class of operators at the program scanner level.

When a root operator is extracted and emitted by the scanner logic switch network 24a and b of FIG. 2 with no adjoining operators, this is referred to as a terminal root. This implies that the scanning algorithm or decision tree is terminated by that root itself. There are two cases which are termed terminal root. One is where the operator is of the ELSE or VARI type. These cases are explicit terminal roots by definition. The other case is where a root, capable of being grouped with other operators, fails to be adjoined due to the scanning algorithm (i.e. decision tree's result). This is the case where the root fails to be terminated by a member of its terminal operator set. Therefore, it is extracted and emitted from the scanner as an implicit terminal root.

When a root operator and one adjoined operator are extracted and emitted from the scanner, this grouping is referred to as a simple sequence or simply a sequence. The second operator in the grouping is referred to as the terminal operator for the root.

When the root operator and two adjoining operators are extracted and emitted from the scanner, this is referred to as an extended sequence, or simply an extension. The second operator of the group is referred to as the extension operator for the root. The third operator is referred to as a terminal operator for the extension.

Having described the various basic root operators, a description will now be given of various examples of such operators and how they are implemented by the scanner logic of FIG. 3. Consider the case of a duplicate operator, DUPL, adjoined by a terminal operator such as LOAD. The duplicate operator will reside in syllable 0 and the LOAD operator in syllable 1 of FIG. 3. The output from ram 40a, addressed by syllable 0, will select DUPL input from ram 40b, which output is a set of control signals that will be passed on to switching network 24b of FIG. 2 by multiplexor 42 of the FIG. 3. Similarly, when the root is NAMC followed by a terminal operator, that terminal operator will reside in syllable 2, the 3-bit output from ram 40a will select the NAMC input of multiplexor 42 for receiving the output of ram 40c accessed by syllable 2. In that case, syllable 1 will contain data that is to be transferred to the output registers of FIG. 2 for storage in the stack. This is how an operator sequence is formed.

For the example of VALC as syllable 0, VALC address parameter as syllable 1, LT8 as syllable 2, literal data as syllable 3 and the divide operator (DIVD) as syllable 4. The divide operator is a terminal operator. In this situation, the 3-bit set of control signals from ram 40a will cause multiplexor 42 to select the VALC input to multiplexor 42 from multiplexor 41c, the input of which is selected by the 2-bit set of control signals received from ram 40c. The input to multiplexor 41c is received from ram 40e. This is how an extension is formed. Similar examples can be given illustrating the operation of the other multiplexor and rams but it is believed that the above description is sufficient to describe the nature of these operations. A summary of the outputs of the program control unit of the scanner of the present invention is illustrated in FIG. 5.

The size of the various rams 40a, ..., 40f, of FIG. 3 will now be described so as to provide a more detailed description of that figure. In addition to the 3-bit set of control signals from ram 40a to multiplexor 42, 45 bits are supplied in parallel to the ELSE input of multiplexor 42.

Ram 40b supplies a 15-bit input to the VARI input of multiplexor 42 and also outputs 12 bits to both multiplexors 41a and 42, including the 2-bit set of control signals to multiplexor 41a. Ram 40c outputs 15 bits, including the 2-bit set of control signals to multiplexor 41b and a 2-bit set of control signals to multiplexor 41c.

Ram 40d outputs 11-bit signals, including the 2-bit set of control signals to multiplexor 41d. Ram 40e outputs an 8-bit set of signals, as does ram 40f.

The output of multiplexor 42 to the rest of the program's scanner is 36 bits wide and includes the following: a 3-bit shift amount value to barrel shifter 22 of FIG. 2; a 3-bit window select value to word window selector 21 of FIG. 2; a 2-bit source select value for the input to POAC output register 30 of FIG. 2; a 2-bit source select value for input to POL register 29; a 3-bit signal indicating the code type of the contents of POL register 29; a 2-bit code type of the contents of POAC register 30; an 11-bit next source select for POM register 28; a 6-bit next source select for POP register 31; and a 4-bit next source select signal for POS register 27.

Figure 4:
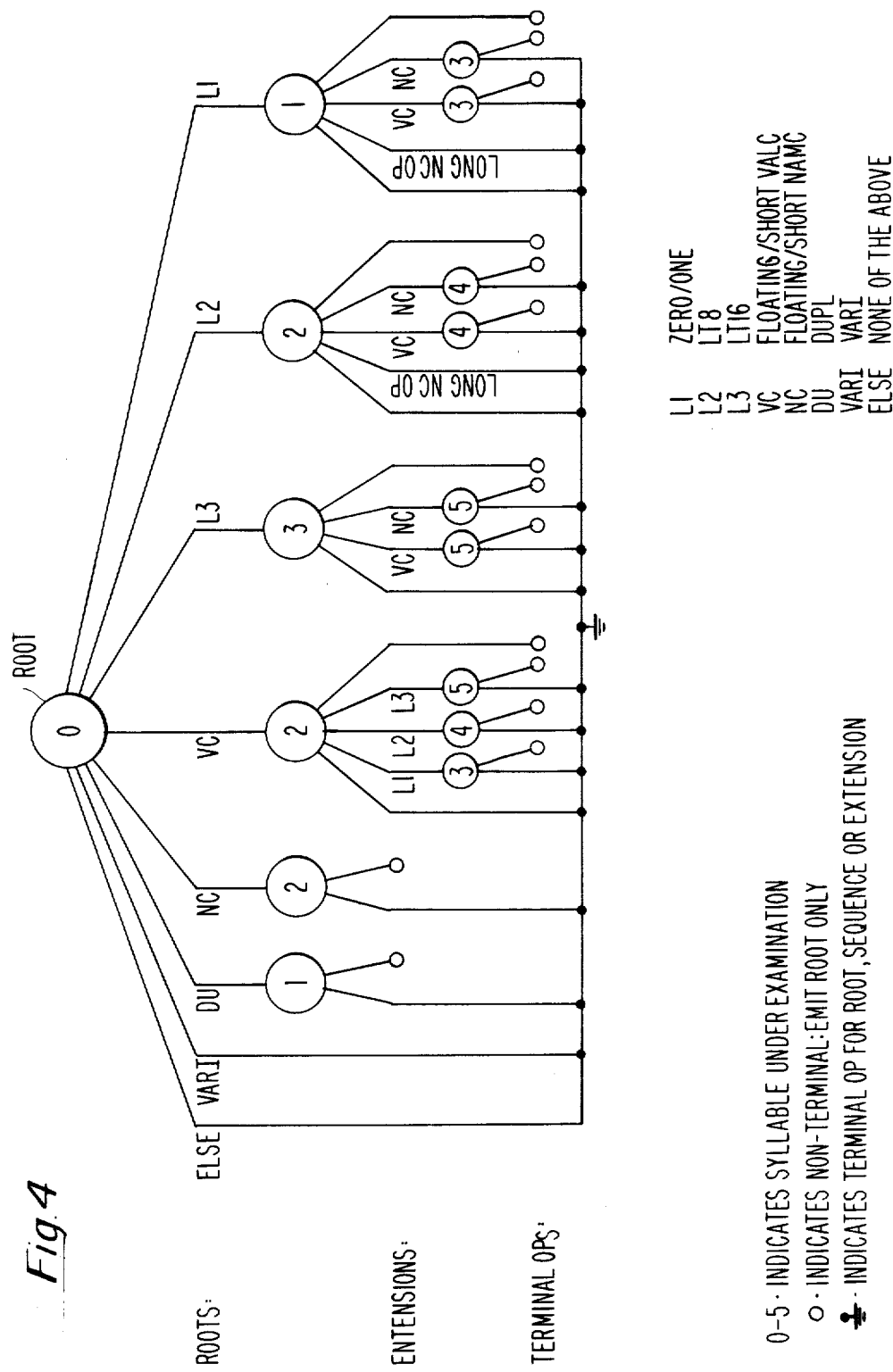
FIG. 4 is a diagram of the decision or logic tree illustrating the operation of the program scanner of the present invention.

The scanning algorithm or decision tree implemented by the scanner logic of FIG. 3 may be better understood from a review of FIG. 4 which is an illustration of the scanner decision tree. As shown therein, all operations of the scanner logic are initiated by the root operator in syllable 0 and its corresponding control signals in ram 40a of FIG. 3. If that root is ELSE or VARI, that root is a terminal root and only the terminal root is emitted. If the root operator is DUPL, then syllable 1 of scan register 23 is examined by ram 40b which outputs the appropriate control signals. If the root operator is NAMC, syllable 2 is examined by its corresponding ram 40c of FIG. 3.

If the root operator is VALC, then syllable 2 is examined by ram 40c which in turn selects outputs from ram 40d as output signals when the extension operator is ZERO/ONE or selects the output of ram 40e as the control signals if the extension operator is LT8 and selects the output of ram 40f as the control signals if the extension operator is LT16. The remaining portions of the decision tree function in a similar manner and are believed to be evident from FIG. 4.

EPILOGUE

A program scanner has been described above for use in a processor having multiple streams of instruction and data flow. The scanner scans the sequence of incoming codes and employs a plurality of rams for parallel detection of various types of syllables in that code. The output of those rams are control signals indicating the various types of codes possible for being grouped together for transmission to various operating units of the processor for concurrent operation. While the present invention has described the employment of rams or random access memories for this purpose, it will be understood that the function of these rams is to store logic or control signals and that they can easily be replaced by read only memories.

While one embodiment of the present invention has been disclosed, it will be evident to those skilled in the art that variations and modifications may be made therein without departing from the spirit and the scope of the invention as claimed.

What is claimed is:

1. A data processor coupled to an external memory and having multiple internal data and instruction streams to concurrently activate various units therein in response to a sequential string of object code syllables, said processor comprising:

an execution unit to execute operator syllables in said object code;

a reference unit to execute external memory reference syllables in said object code; and a program scanner including:

a scanning register having a plurality of parallel object code syllable positions to receive a portion of said string of object code;

a plurality of output registers coupled to said various units of said processor;

a switch network coupling the respective syllable positions of said scanning register to different ones of said output registers; and a plurality of storage means, one for each of said syllable positions in said scanning register and coupled to said respective syllable positions to be addressed thereby, said respective storage means being coupled to said switch network and containing control signals indicating which of said syllable positions of said scanning register should be coupled to different ones of said output registers for concurrent transmission of the contents of said syllable positions to said different ones of said output registers.

2. A processor according to claim 1 further including:

a central data buffer coupled to said execution unit, said reference unit and said output registers for data transfer therebetween.

3. A processor according to claim 2 wherein:

said scanning register includes shift register means to shift to the lowered number syllable positions those syllables not transmitted to said output registers.

4. A processor according to claim 3 wherein said external memory stores strings of said object code and wherein;

said scanning register is coupled to said external memory to receive a plurality of said object code syllables to fill unused syllable positions in said scan register.

5. A processor according to claim 4 wherein said program scanner further includes:

syllable selection means to receive said strings of object code syllables for transmission to said scanning register; and a program counter to specify how many syllables are to be supplied to said scanning register.

6. A processor according to claim 5 wherein said syllable selection means includes:

a cache memory to receive said strings of object code syllables from said external memory and to store said object code syllables for future transmission to said scanning register; and word selection means to receive from said cache memory means a plurality of said syllables forming a plurality of words and to select from said plurality of words the next syllables in a string of syllables for transmission to said scanning register.

* * * * *